Feb. 23, 1937.  J. L. ANDERSON  2,071,808
METHOD AND APPARATUS FOR FUSION WELDING
Filed Feb. 25, 1932  2 Sheets-Sheet 1
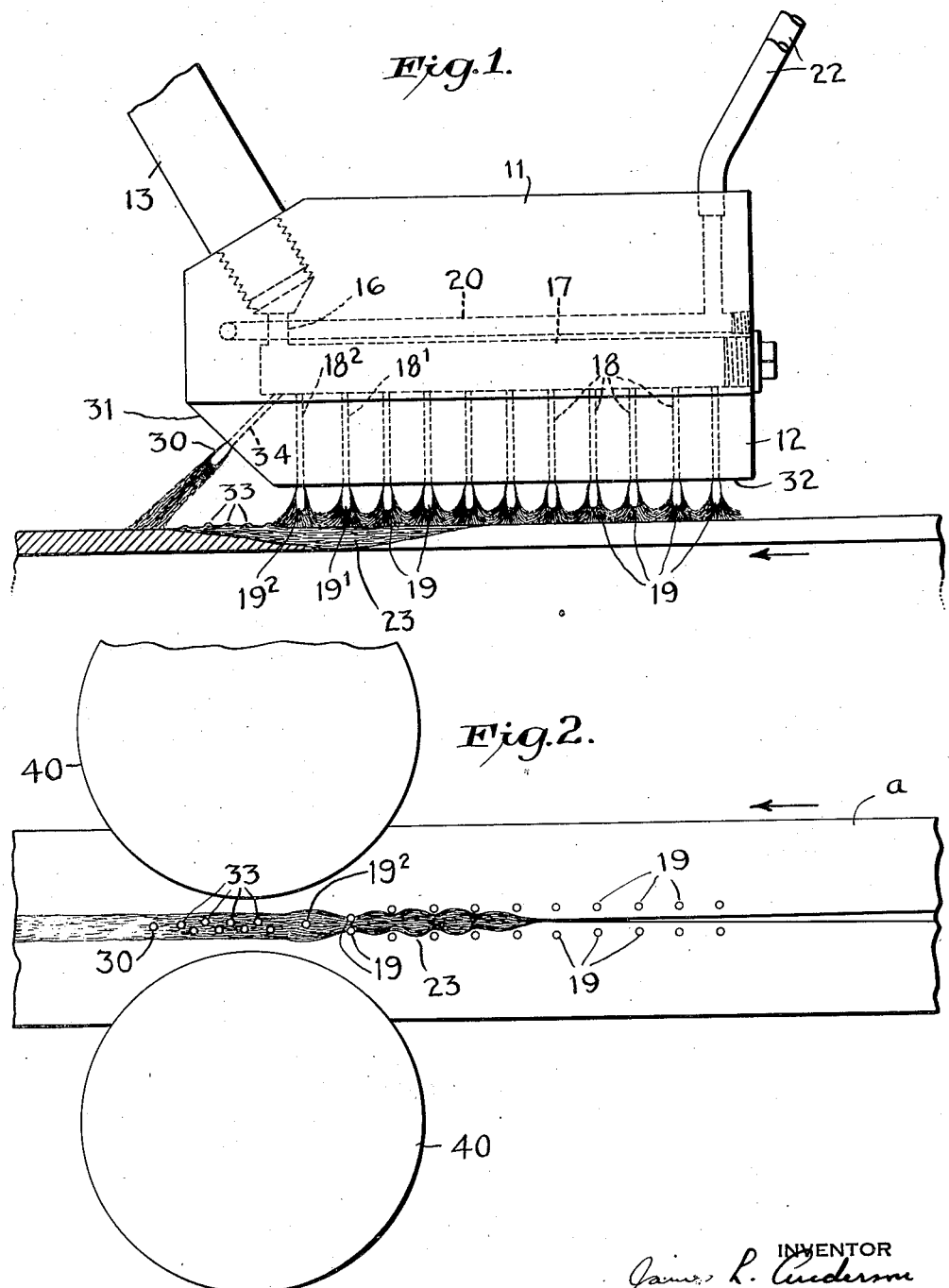

Feb. 23, 1937. J. L. ANDERSON 2,071,808
METHOD AND APPARATUS FOR FUSION WELDING
Filed Feb. 25, 1932  2 Sheets-Sheet 2
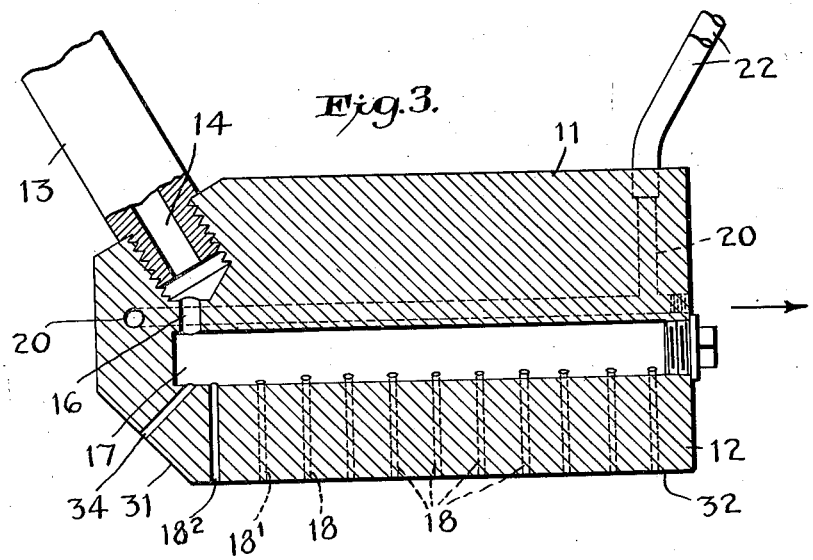
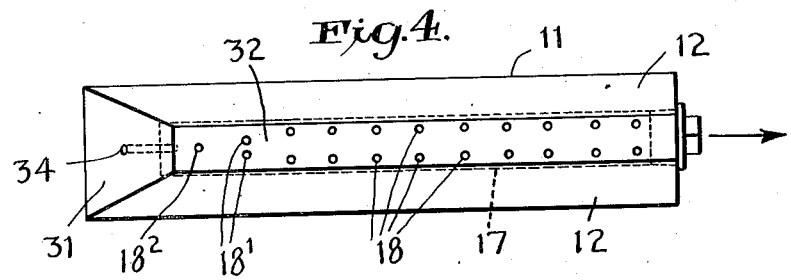
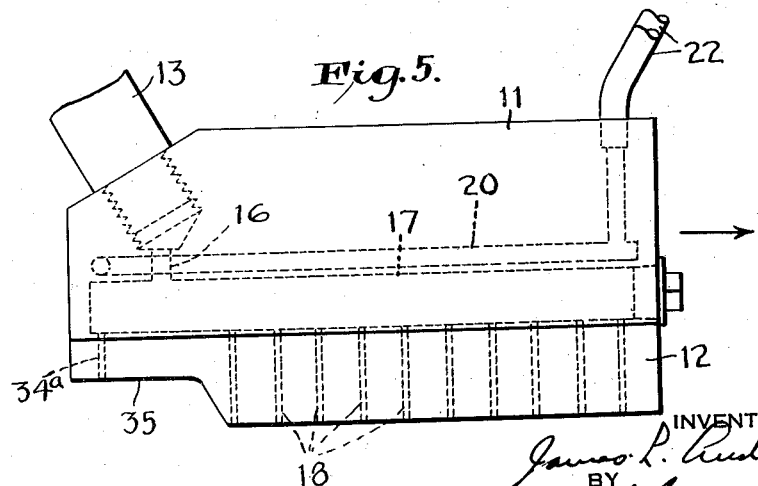
INVENTOR
James L. Anderson
BY
ATTORNEY Patented Feb. 23, 1937

2,071,808

UNITED STATES PATENT OFFICE 2,071,808

METHOD AND APPARATUS FOR FUSION WELDING

James L. Anderson, Tenafly, N. J., assignor to Air Reduction Company, Incorporated, New York, N. Y., a corporation of New York Application February 25, 1932, Serial No. 594,998

15 Claims. (Cl. 113—59)

This invention relates to the art of progressive fusion welding of seams between sheets, plates, or the edges of open seam pipe or tubing, and it is particularly concerned with the art of welding by high temperature flame jets, although in certain aspects it has broad applicability to fusion welding generally.

The invention relates more particularly to improvements in fusion welding methods and apparatus for welding at relatively high linear speeds and with good penetration, to produce highly satisfactory welds of great strength and of good appearance.

It has been found in welding poor grades of steel, or those kinds which contain much slag and gas, or in welding other metals or metal compositions, where substantial quantities of gases are formed or absorbed upon fusion, that unsatisfactory welds are frequently obtained, which welds are scarred and pitted with many eruptions and occlude gas bubbles. For these, or other, reasons inferior welds, or welds of poor appearance, may result.

The object of the present invention is to provide a simple and advantageous means for improving the weld immediately after each portion of it has been made, or while it is still in a formative state.

One of the objects is to provide a fusion welding apparatus and method which will serve to erase craters and eruptions and/or to release occluded gas bubbles, all without preventing full attainment of the objects previously set forth and without difficulty or complication in the apparatus and process. These, and other advantages, are secured by reheating, or by actually partially melting, the metal of the freshly made weld, after it has cooled slightly and has partly solidified, or has passed from the molten state to a more or less plastic condition.

Even though there be little or no pronounced eruptive manifestation, such re-heating of the metal of the weld has beneficial effects.

Another object of the invention is to provide an improvement in progressive tube or pipe welding apparatus and method, in which the welded seam is progressively re-heated or re-melted shortly after it passes the bite of so-called welding rolls, and in which the welding and re-heating agencies are at opposite sides of the transverse center line of the rolls.

Another object is to provide an effective means for producing reinforced or high welds, when desired.

In the drawings, which illustrate several embodiments of the present invention:

Fig. 1 is a side elevation of a torch for carrying out the invention, and illustrating, somewhat schematically, the welding operation;

Fig. 2 is a plan view illustrating an application of the flame jets to a seam being welded in pipe or tubing, the so-called welding rolls being indicated;

Fig. 3 is a side central sectional view of the welding torch or tip shown in Fig. 1;

Fig. 4 is a bottom view of the welder; and

Fig. 5 is a side elevation of a modification.

The torch tip comprises a narrow oblong block 11, having a tapered nozzle portion 12 at the bottom. A mixer stem 13, preferably inclined, is inserted into an upper corner of the block, this stem being provided with a central passage 14 (see Fig. 3) through which oxygen-acetylene mixture is supplied. Communicating with the passage 14 is a short bore 16 delivering into a longitudinal header passage 17.

From the bottom of this header passage 17, there extend downward small jet passages 18, from which are emitted the flame jets 19. In a machine welding torch there is a seamwise-extended series of jets adapted to preheat and melt the metal of the seam, by successive increments of heat. The jet passages 18 are preferably arranged in two adjacent parallel rows adapted to extend a substantial distance lengthwise of the seam to be welded, and spaced transversely to straddle the seam. Toward the rear end of the block 11 the jet passages 18' and their jets 19' are preferably brought in nearer to the center line of the seam, and the two rows may merge together and terminate in a single jet passage $18^2$ delivering a jet $19^2$ at the rear end of the group of welding jets.

The torch tip is cooled by means of water passages 20 having supply and return connections 22.

In the welding operation, the welder is moved at definite speed, in continuous straight-line motion, along the seam, or the work is similarly moved in the contrary direction, to the same effect. The arrows in Figs. 1 and 2 indicate the direction of relative motion referred to the work, whereas in Figs. 3 to 5 the arrows indicate the direction of relative movement referred to the tip. The forward jets preheat the solid metal and the succeeding jets melt it progressively, forming an elongated excavation puddle of metal 23, the solidification of which forms the weld. One or more central jets, such as the jet 19', may be employed to obtain a leveling effect, to overcome any tendency of the weld to be channeled at the sides. Such jets, if present, follow closely after the other jets, and belong to the welding group or series.

In the present invention a new heating agency in the nature of a flame jet, or jets, is employed. This agency, represented in the drawings by the jet 30, is disposed far enough to the rear, and well away from the final welding or leveling jets, so that the molten metal of the weld will have an opportunity, in the interval, to cool slightly and become more or less solid or plastic, whereupon it is re-heated and preferably re-melted. The distance aft of the jet 30 and the degree to which the metal is allowed to pass from the molten to the solid state will, of course, vary for different metal and under different conditions of operation.

Preferably, the surface 31 of the welding tip 11 from which the re-heating jet 30 is emitted is positioned at a substantially higher level than the surface 32 from which the jets 19 are delivered, and as a result the hottest portion of the flame, namely at the tip of the inner cone, will be considerably removed from the metal to be treated. This will prevent the weld metal from being heated as powerfully as by the other jets.

Figs. 1 and 2 indicate diagrammatically a series of craters and bubbles 33 which may remain after passage of the last jet 19². These craters and bubbles are apt to form or erupt at a distance behind an ordinary welding torch, when the metal of the weld cools down slightly from the fluid condition and reaches a certain state of plasticity, this, however, being given by way of illustration. The additional jet 30 is so placed as to allow the metal to cool or solidify sufficiently to favor formation and release of the gas bubbles and to prolong this condition. At the same time, it is desirable that the additional jet 30 be not placed so far to the rear that the metal would cool too much. As a general rule, these bubbles and craters occur or collect at or near the top of the weld and toward the center, so that it is only necessary to re-melt or soften the upper portion of the substantially completed weld. The supplementary heating may be sufficient to release the bubbles, or to erase craters or other irregularities, or to accomplish both of these results.

In Figs. 1, 3 and 4, the jet 30 is delivered from a rearwardly inclined jet passage 34 drilled to intersect the rear end of the oxyacetylene chamber 21, or other supply passage, and the orifice face 31 is diagonal. Such a jet not only acts on the metal at the intersection of its general oblique direction with the surface of the weld, but also throws radiant heat from its under side over a longer extent of the weld.

In the embodiment of Fig. 5 the rear of the tip 11 is horizontally stepped as indicated at 35, and the re-heating flame or jet is delivered from a perpendicular passage 34ª.

The angular disposition of the re-melting jet as shown in Figs. 1, 3 and 4 is more useful for most purposes, and has a special advantage when a reinforcement or elevation of the welded seam is desired. A backwardly inclined terminal jet tends to pile up the metal, and can be used very effectively for that purpose irrespective of other functions. In Fig. 1 the jet 30 is shown as having a 45° inclination, but the angle of the jet may be varied to secure the desired degree of action. Additional metal may be supplied from a welding wire, in known manner.

Under suitable circumstances a plurality of secondary heating jets may be utilized, or such additional crater-erasing and bubble-releasing flames may be incorporated in a separate welding tip or torch, which may be integrally or otherwise attached to the welding tip. Such additional jets may also be employed in connection with hand welding torches. An additional divergent flame such as the flame 30 may be incorporated in welding torches generally for securing reinforcement even when the bubble-releasing and crater-erasing operations are not necessary.

With suitable modification the invention may be applied to fusion welding processes other than those involving high temperature flames. As, for example, in arc welding processes where the weld tends to be porous and absorb nitrogen from the air, the utilization of a re-melting flame may serve not only to eliminate gases from the weld but also to smooth the weld and refine the grain of the weld.

Although the spacing of the preheating and welding jets and the additional re-heating jet may be widely varied to suit the particular conditions of welding operation, it has been found satisfactory in certain commercial embodiments to space longitudinally the preheating and welding jets from about ¾" to ⅜", which spacing may decrease toward the rear of the tip as the fusing zone is approached, and to space the additional reheating jet behind the last fusing jet by a substantially greater distance, which may be 1½ to 2 or more times the average spacing of the flame jets. However, the actual spacing will depend, among other things, on the presence or absence of provisions having an active cooling effect on the metal.

The invention is particularly applicable to, and has special advantages in connection with, the welding of pipe and tubing. In Fig. 2, the pipe or tube a is shown passing between a pair of rolls 40 on vertical axes. Such rolls are customarily driven, and in oxyacetylene welding are generally termed "welding rolls", not because they are the actual welding agency but because they are at or near the welding region. What they do is to hold the tube against expansion and opening while it is being welded, to hold it in proper relation to the mechanically supported torch, and to exert such compression, of a moderate order, as may be desired to insure a flush or a raised weld, as the case may be. It is unnecessary to illustrate more of a tube-welding apparatus, or the adjusting bracket by which the torch is supported in definite relation to the traveling tube and to the rolls.

It will be observed that the re-heating jet 30 acts or is directed against a point on the new weld rather close behind the transverse center line of the rolls, whereas the welding and preheating jets extend in front of the bite of the rolls. The rolls extract much heat from the tube, with a consequent chilling effect upon the congealing weld. In the absence of this or other positive cooling means, it might be desirable to dispose the re-heating jet somewhat farther back. There are many conditions in which a partial re-melting of the weld, or a prolongation of the period of plasticity, after the metal has cooled moderately, confers benefits in respect to either the properties or the appearance of the weld, and, therefore, in the quality of pipe or tube that may be produced. The degree to which the weld is allowed to cool, for the purpose of this invention, before it is subjected to the effect of an auxiliary heating agency would usually be within a range of 500° F. below the maximum fusion temperature, or considerably less, though in some cases the cooling and solidification might be allowed to proceed even further.

As many changes could be made in the apparatus and in the execution of the process, and many apparently widely different embodiments of this invention could be devised without departing from the scope thereof, it is desired that

I claim:

1. A method of fusion welding seams which comprises progressively heating and fusing the seam by the application of a relatively large number of high temperature flames thereto, permitting or causing the weld to cool sufficiently to permit gases to escape from the metal, and thereupon releasing gas pockets from the weld and erasing craters or other irregularities to smooth the weld by applying a high-temperature gas flame to the weld immediately after it has cooled sufficiently to permit gases to escape from the metal.

2. A method of fusion welding seams which comprises progressively heating and fusing the seam by the application of a longitudinally extending, transversely spread group of jets, permitting or causing the metal of the weld to cool moderately and then smoothing the weld by acting upon such metal with one or more flame jets applied at or close to the center line of the seam and spaced considerably to the rear of the other jets.

3. A method of fusion welding seams which comprises progressively heating and fusing the seam by the application of high temperature flame jets thereto in which said flame jets are of such a character as to have inner cone portions and outer envelope portions, and in which the tips of said cones are closely applied to the seam, and then acting upon the welded and partially solidified seam by a similar flame jet so elevated above the seam that the tip of the inner cone will be considerably removed therefrom.

4. Improvement in the method of progressively welding seams by the application of intensely hot welding flame jets at opposite sides of the seam removed from the edges, to fuse the edge regions and cause them to flow together, characterized by the application toward the rear of said jets of a plurality of finishing jets acting substantially in the central longitudinal line, at least one of the central jets being spaced sufficiently rearwardly of the preceding jet to impart a finished smoothness to the weld by acting upon the metal after it has had an opportunity to cool and partly solidify before it is re-heated.

5. A method of progressively welding and smoothing seams, which comprises heating and melting the metal to form the weld, allowing or causing the metal of the weld to solidify, and then applying a high-temperature gas flame to the weld metal and re-melting the outer portion of the weld without adding more metal to release gas from the metal and smooth the weld.

6. A method of progressively welding seams, which comprises heating and melting the metal to form the weld, and, when the metal of the weld has cooled to a plastic condition, removing gas pockets and giving the weld a final smoothing by applying a gas flame to reheat the metal of the weld without the addition of more metal.

7. A method of progressively welding and smoothing seams, which comprises heating and melting the metal to form the weld, allowing or causing the metal of the weld to cool to a plastic condition, and acting upon the metal of the weld while it is still plastic by a gas flame jet which is directed rearwardly with respect to the movement of the torch and which reheats the metal to release gas from said metal and smooth the weld without applying additional metal.

8. A method for progressively welding the seams of pipe or tubing, which comprises passing the material between lateral rolls, heating and fusing the metal of the seam regions in advance of the bite of such rolls, and releasing gas from the weld by re-applying heat to the metal of the weld behind the bite of the rolls.

9. A method of progressively welding and smoothing seams, in which the metal of the seam edges is heated and fused to a puddle by means of successive high-temperature flame jets, in continuous relative rectilinear travel between the jets and the work, and in which minor heating is supplied, by an auxiliary flame jet or jets, a sufficient distance behind the welding jets to insure the liberation of gases and the elimination of craters from the freshly-made weld, before the final solidification is permitted.

10. An oxyacetylene welding torch apparatus for progressively fusing together the edges of seams, having means for forming a mixture of oxygen and combustible gases, means for delivering preheating and welding jets disposed in a longitudinally extending group, and means considerably above and to the rear of said group for delivering an additional flame jet.

11. A machine welding torch for progressively fusing together the edges of seams, having means for forming the mixture of the oxygen and combustible gas, means for delivering the mixture through a series of preheating and welding jet passages and an additional flame jet passage positioned considerably behind and at a divergent angle to the aforesaid jets.

12. As an article of manufacture, a welding torch having means for heating and fusing the metal of the seam, and having means behind and above the heating and fusing means for delivering an after flame jet in position to re-melt the weld.

13. In tube welding apparatus, the combination of laterally spaced rolls between which the tube is passed, means for heating and fusing the seam region in advance of the bite of said rolls, and means for re-heating the metal of the weld behind the bite of the rolls so that gases are released from the metal and a smooth weld is obtained.

14. A welding torch, comprising a body provided with numerous successive and transversely spaced ports calculated to deliver heating and welding jets on opposite sides of the center line of a seam, and one or more flame ports spaced a considerable distance behind and above the line of the other jets and in or adjacent the plane of the center line for heating the metal of the weld after it has cooled moderately below its temperature under the welding jets.

15. A method of progressively welding and smoothing seams, which comprises heating and melting the metal to form the weld, allowing or causing the metal of the weld to cool moderately to a temperature which causes the formation of gas pockets or craters, and then applying a flame jet to the weld and reheating it with less heat than used to make the weld but sufficiently to release imprisoned gases and eliminate craters from the metal of the weld.

JAMES L. ANDERSON.